United States Patent
Yoo et al.

(10) Patent No.: US 7,877,815 B2
(45) Date of Patent: Jan. 25, 2011

(54) BATTERY AUTHENTICATION IN A WIRELESS COMMUNICATION DEVICE

(75) Inventors: Doosun Yoo, San Diego, CA (US); Murali Krishna Bandaru, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1181 days.

(21) Appl. No.: 11/336,447

(22) Filed: Jan. 20, 2006

(65) Prior Publication Data

US 2007/0192877 A1    Aug. 16, 2007

(51) Int. Cl.
 *G08B 29/00* (2006.01)
(52) U.S. Cl. .............................. 726/34; 726/35; 726/36; 713/300; 713/320; 713/330; 713/340; 709/206; 455/411; 455/572; 380/270
(58) Field of Classification Search .............. 726/34–36; 713/300, 320, 330, 340; 455/411, 572; 380/270; 709/206
See application file for complete search history.

(56) References Cited

U.S. PATENT DOCUMENTS

| | | | |
|---|---|---|---|
| 4,670,857 A | | 6/1987 | Rackman |
| 5,717,306 A | * | 2/1998 | Shipp .......................... 307/125 |
| 6,163,361 A | | 12/2000 | McIntyre et al. |
| 6,190,257 B1 | | 2/2001 | Takeda et al. |
| 6,496,936 B1 | * | 12/2002 | French et al. .................... 726/7 |
| 6,738,876 B2 | | 5/2004 | La |
| 6,972,541 B2 | * | 12/2005 | Matsushiro et al. ......... 318/801 |
| 2004/0203576 A1 | * | 10/2004 | Droste et al. ............. 455/404.1 |
| 2005/0001589 A1 | | 1/2005 | Edington et al. |
| 2005/0050325 A1 | | 3/2005 | Ohkubo |
| 2005/0188206 A1 | | 8/2005 | Kwok |
| 2005/0227669 A1 | * | 10/2005 | Haparnas ..................... 455/410 |
| 2006/0117176 A1 | * | 6/2006 | Sasaki et al. ................ 713/155 |
| 2006/0178170 A1 | * | 8/2006 | Chung et al. ................ 455/572 |
| 2007/0123316 A1 | * | 5/2007 | Little ......................... 455/573 |
| 2007/0143864 A1 | * | 6/2007 | Cabana et al. ................ 726/36 |

FOREIGN PATENT DOCUMENTS

EP    1 775 653 A    4/2007

* cited by examiner

*Primary Examiner*—Thanhnga B Truong

(57) ABSTRACT

Multiple battery authentication security levels and procedures alert a user of counterfeit or unapproved batteries that are installed after manufacture of the wireless communication device. In an exemplary a battery authentication system, a mobile device sends a pre-stored plain text to a battery installed in the mobile device. An approved battery receives the plain text and performs an encryption algorithm on the plain text. Encrypted text is sent back to the mobile device. The mobile device compares the received encrypted text with a pre-stored encrypted text. If the received encrypted text matches the pre-stored encrypted text, then the battery is authenticated. Upon completion of the authentication of the installed battery, the mobile phone conducts normal battery and charging operation. If the received encrypted text does not match the pre-stored encrypted text, then the device enters authentication failure events that limit the use of the battery.

17 Claims, 4 Drawing Sheets

| CAPABILITY LEVEL | BATTERY DISCHARGE | BATTERY CHARGE | E911/MO/MT CALLS | WARNING MESSAGE |
|---|---|---|---|---|
| HIGH | NO (EXCEPT FOR E911) | NO | YES/NO/NO | YES |
| MEDIUM | YES | NO | YES/YES/YES | YES |
| LOW | YES | YES | YES/YES/YES | YES |
| DISABLED | YES | YES | YES/YES/YES | NO |

BATTERY AUTHENTICATION IN A WIRELESS COMMUNICATION DEVICE

BACKGROUND OF THE INVENTION

1. Field of the Invention

The present invention relates to the field of wireless communication devices. More specifically, the invention relates to the authentication of a battery installed in a wireless communication device.

2. Related Art

A typical wireless communication device, such as a mobile phone, comprises, among other things, a processor coupled to a memory and to a transceiver, each enclosed in a housing. A mobile power source, such as a battery, is coupled to and supplies power to the processor, the memory and the transceiver. A speaker and a microphone are also enclosed within the housing for transmitting and receiving, respectively, acoustic signals to and from a user of the wireless communication device. A battery is typically installed in the device at the time of manufacture, and therefore, the manufacture can regulate these "authentic" batteries to ensure correct and safe performance of the batteries in the device. However, there is a growing concern for the mobile phone manufactures regarding the safety of replacement batteries that are later installed by the consumer.

Low quality, unauthenticated or counterfeit batteries, that is, batteries that are not approved by the manufacturers, can pose potential dangers to the device users. For example, counterfeit batteries may malfunction, explode or catch fire and cause injury to the user and damage to the wireless device. Therefore, a need exists in the wireless communication device industry to implement safety mechanisms in the devices to ensure the use of approved batteries.

SUMMARY OF THE INVENTION

Multiple battery authentication security levels and mobile user interactive interfaces are disclosed which addresses and resolves one or more of the disadvantages associated with counterfeit or unapproved batteries that are installed in wireless communication devices after manufacture of the devices.

By way of illustration, in an exemplary a battery authentication system, a mobile device sends a pre-stored plain text to a battery installed in the mobile device. An approved battery receives the plain text, performs an encryption algorithm on the plain text, and outputs encrypted text. The encrypted text is sent back to the mobile device. The mobile device compares the received encrypted text with a pre-stored encrypted text. If the received encrypted text matches the pre-stored encrypted text, then the battery is authenticated. Upon completion of the authentication of the installed battery, the mobile phone conducts normal battery and charging operation. If the received encrypted text does not match the pre-stored encrypted text, then the device enters authentication failure events that limit the use of the battery.

Other features and advantages of the present invention will become more readily apparent to those of ordinary skill in the art after reviewing the following detailed description and accompanying drawings.

DETAILED DESCRIPTION OF THE INVENTION

Figures 1, 2:
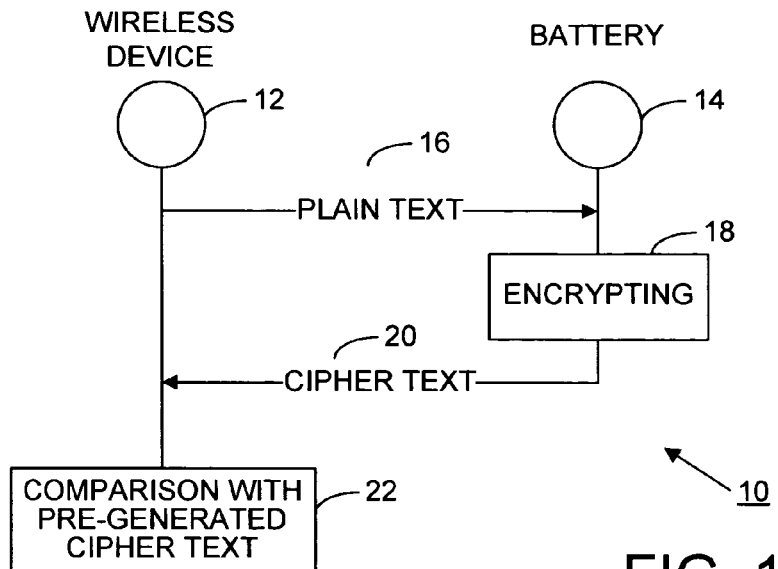
FIG. 1 illustrates an exemplary method and device for providing battery authentication in a wireless communication device according to one embodiment of the present invention.
FIG. 2 is a table showing capabilities of the wireless communication device for various battery authentication levels according to an embodiment of the present invention.

Battery authentication is a process in which the authenticity of the battery in use in a wireless communication device is identified specifically, as an approved device or as an unapproved device. FIG. 1 illustrates a simplified exemplary battery authentication system 10 according to one embodiment of the invention. The illustrated embodiment 10 utilizes a cipher technology approach in which the battery in test 14 returns cipher text 20, also referred to herein as encrypted text, to the wireless device 12 in response to a plain text input 16 sent by the wireless communication device 12. The battery 14 utilizes an encrypting algorithm 18 on plain text received from the wireless communication device 12. Cipher text 20 is output from the battery 14 to the wireless communication device 12. Upon receiving the cipher text 20 from the battery 14, the wireless communication device 12 determines whether the cipher text 20 is correct by comparing the received cipher text 20 with pre-stored cipher text that is stored in a memory of the device 12, block 22. The pre-stored cipher text is generated by the same encrypting algorithm used by the battery 14.

An exemplary encryption algorithm 18 that may be utilized in an embodiment of battery authentication is a block cipher. A block cipher is a symmetric key cipher which operates on groups of bits with fixed lengths, i.e., "blocks", with an unvarying transformation. For example, during encryption, a block of plain text is input into a block cipher. The block cipher outputs a corresponding block of cipher text. The exact transformation is controlled using a key that is also provided to the block cipher. Decryption in the wireless device is accomplished by a similar process in which the decryption algorithm accepts the block of cipher text together with the key, and outputs the original block of plain text. An encryption algorithm may be performed utilizing firmware or software or other suitable techniques.

Figure 6:
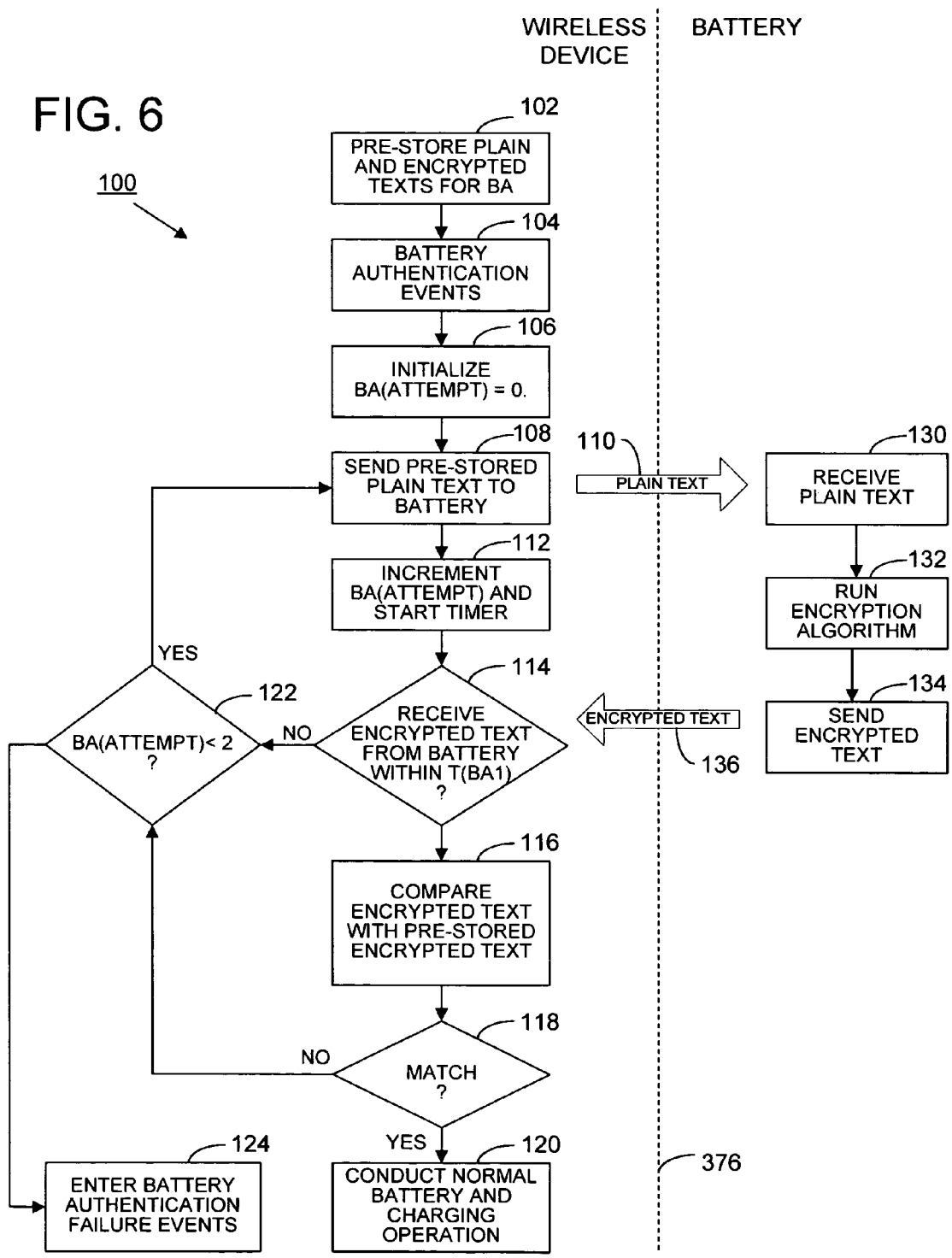
FIG. 6 illustrates an exemplary detailed embodiment of the method of FIG. 1 for providing battery authentication in a wireless communication device.

FIG. 6 illustrates a battery authentication method 100 according to one embodiment of the invention. In block 102, plain and encrypted texts are supplied to the wireless communication device for use with the battery authentication method. Encrypted texts also are referred to herein as cipher texts. For security issues, an encryption algorithm and a key do not reside in the device. Instead, a separate tool generates two pairs of a plain text and a corresponding encrypted text using an encryption algorithm. The two pairs are provided with each mobile during provisioning. Since the plain text is a number that is generated randomly, each device is expected to have two distinct pairs of plain texts and encrypted texts. This minimizes any attempt to bypass the algorithm by extracting the encrypted text and attempting to use it on other mobiles.

Continuing with block 104 of FIG. 6, battery authentication events trigger the device to perform the procedures to verify the authenticity of the battery in use. In one embodiment of the method, preconditions are assumed as follows: a battery is not attached to the mobile device and no external power source is connected to the mobile device. Given this precondition, there can be various triggering events for battery authentication. A first triggering event occurs if the user attaches a battery to the wireless device and powers on the device. In another triggering event, the user attaches a battery to the mobile device which is in the power down state. The user then connects an external power source to the mobile. In another triggering scenario, an external power source is connected to the device without a battery attached. The user then attaches a battery to the device.

Upon sensing one of the battery authentication triggering events, the mobile device enters into a low power mode, and remains in the low power mode throughout the verification procedure. The low power mode prevents the mobile device from originating and terminating calls during the battery authentication procedure. A variable which indicates battery authentication attempts is set to zero, block 106, for example, "BA(attempts)"=0. The device fetches a pair of the pre-stored plain and cipher texts from the device database in a random manner. In block 108, the device sends the plain text 110 through a serial communication link 376, also shown in FIG. 7, to the battery. According to one embodiment of the invention, the communication link is a Universal Asynchronous Receiver/Transmitter (UART).

The mobile device then increments the battery authentication attempts counter and starts a timer, block 112. If encrypted text 136 is not received from the battery within a pre-determined time limit T(BA1), as shown by decision block 114, then the mobile determines the current number of authentication attempts, block 122. In the exemplary embodiment of FIG. 6, the number of acceptable attempts is shown as two. That is, if the number of attempts equals or exceeds two, then the mobile device enters battery authentication failure events, block 124. However, it should be understood that the number of acceptable attempts may be increased or decreased according to other embodiments of the invention. For example, re-sending the plain text and the key is desirable to account for possible communication errors between the mobile device and the battery. According to one embodiment of the invention, the time limit T(BA1) is approximately 150 msec. However, the time limit of other embodiments may be lower or higher depending on phone configuration. If the number of attempts is less than the pre-determined limit, block 122, then the mobile device resends the pre-stored plain text to the battery, block 108, and continues in the loop until the number of allowed attempts is exceeded, or until the battery returns encrypted text to the mobile device, block 114.

Continuing with block 116, if the encrypted text is received within the predetermined time limit T(BA1), then the device compares the received encrypted text with the pre-stored encrypted text. In block 118, if the received encrypted text matches the pre-stored encrypted text, then the battery is authentic and normal battery and charging operations can proceed, block 120. According to one embodiment, the battery authentication process is transparent to the user if the authenticity of the battery is identified as genuine. If the received encrypted text does not match the pre-stored encrypted text, block 118, then the device determines whether the number of attempts has exceeded the allowed limit, block 122. If the number of allowed attempts has exceeded the limit, the mobile device enters battery authentication failure events 124, which are discussed further with references to FIGS. 3, 4 and 5. If the number of allowed attempts has not exceeded the allowed limit, block 122, then the mobile device resends the pre-stored plain text to the battery, block 108, and continues the loop until the number of allowed attempts is exceeded, or until the battery returns the expected encrypted text.

Continuing with FIG. 6 from the perspective of the battery, the battery receives plain text from the mobile device, block 130. The battery runs an encryption algorithm on the plain text, block 132. The encryption algorithm is the same algorithm used to generate the pre-stored encrypted text that is stored in the mobile device. The battery then sends the encrypted text 136 to the mobile device, block 134. As discussed above, the mobile device does not store the encryption algorithm. Rather the plain text and the encrypted text are generated from another source and stored in the phone during provisioning of the mobile phone.

Once the installed battery is identified as counterfeit, that is, the battery authentication fails, the mobile handset will follow different security procedures based upon the security levels set by the service provider's needs while provisioning the mobile handset. The user also is provided with warning pop-up messages with different options based on the security level setting. The security level is used to set different levels of the battery security including disabling the battery authentication feature.

A security level table 30 of FIG. 2, illustrates battery authentication security levels and mobile phone capabilities when the battery is identified as a counterfeit. This feature allows service providers to apply different security levels to meet their specific market needs. As shown in FIG. 2, the battery security level settings 32 can be "high", "medium", "low" or "disabled". This setting can be configured during provisioning of the mobile device. According to one embodiment, the authentication process can be disabled through the user interface with proper security access. The battery discharge column 34 indicates whether the battery is allowed to discharge for a particular security level. That is, if the battery is allowed to discharge, then the phone can be used for initiating and receiving calls. The battery charge column 36 indicates whether the battery is permitted to be charged for a particular security level. The E911 column 38 indicates whether an E911 call can be made, whether the mobile can originate a call (MO, mobile origination), and whether a mobile can accept incoming calls (MT, mobile terminating). The warning message column 40 indicates whether the mobile device will display a warning message to the user that the installed battery is not an authentic battery and that power down may occur with the exception that power will be provided for making an E911 call.

Continuing with the security level table 30, if the security level setting is set to "disabled", then the battery can be used to power the mobile, the battery can be charged, E911 calls are enabled, the mobile phone can initiate calls and receive incoming calls, and the mobile does not display warning messages. According to one embodiment of the invention, if the battery authentication level is set to "disabled" then the mobile device does not send a plain text to perform the battery authentication procedure. In an alternate embodiments, battery authentication may proceed, for example, in a background procedure that is transparent to the user.

If the security level setting is set to "low", then the battery can be used to power the mobile, the battery can be charged, E911 calls are enabled, the mobile phone can initiate calls and receive incoming calls, and the mobile does display warning messages that the battery is not authentic. If the security level setting is set to "medium", then the battery can be used to power the mobile, the battery cannot be charged, E911 calls are enabled, the mobile phone can initiate calls and receive incoming calls, and the mobile displays a warning message that the battery is not authentic. If the security level setting is set to "high", then the battery is only used to power the mobile when an E911 call is made, the battery cannot be charged, E911 calls are enabled, the mobile phone cannot initiate calls and cannot receive incoming calls, and the mobile does display warning messages that the battery is not authentic. In addition to message display, embodiments of battery authentication may provide an audible alert sound if the battery is not authentic.

Figure 3:
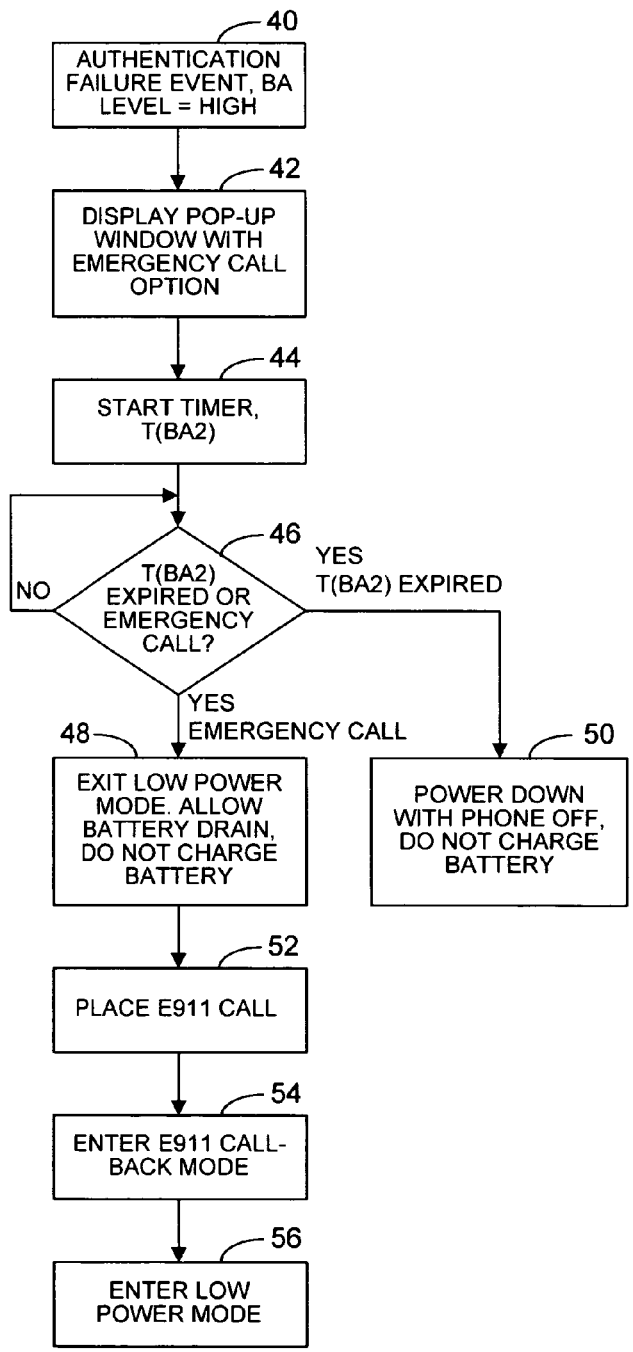
FIG. 3 is a flow diagram of an exemplary method of battery authentication for a battery authentication level set to "high" according to one embodiment of the present invention.

The battery authentication failure events of block 124 of FIG. 6 are described in detail with reference to FIGS. 3, 4 and 5. FIG. 3 illustrates a failure event method for a battery authentication security level set to "high". Starting in block 40, the mobile has entered a battery authentication failure event with a security level set to high. The device remains in a lower power mode from the battery authentication process. The mobile device displays a pop-up window informing the user that the installed battery is not authentic and that the device cannot be used for normal purposes, clock 42. However, in case of an emergency, the pop-up window provides an option for the user to make an E911 call. In block 44, a timer T(BA2) is started.

The device then determines whether a pre-determined time period T(BA2) has expired or whether an emergency call has been made, block 46. If the pre-determined time has expired, the mobile device automatically powers down and battery re-charging is not allowed, block 50. According to one embodiment of the invention, the pop-up window clears after the timer, T(BA2), expires. According to an exemplary embodiment of the invention, if a device user dials E911 to make an emergency call, upon the first digit entry, the mobile clears the pop-up window and exits the low power mode, block 48. The battery is allowed to drain, but charging of the battery is not allowed. The mobile device then enters the system determination state as directed by the preferred roaming list (PRL), and acquires a system. The E911 call is placed upon service availability, block 52. The phone then enters emergency call back mode (ECBM) if applicable, block 54. The device then re-enters low power mode, block 56. In ECBM, the device idles on a system to stay available for a call back from a local Public Safety Answering Point (PSAP). If the user exits the emergency call back mode after placing the E911 call, then the device powers down.

In some circumstances, the user may connect an external power source to the mobile phone during the battery authentication process. If the external power source uses a low power adapter, the mobile remains in the low power mode since the low power adapter cannot provide sufficient power to allow a call to be initiated. If the external power source is connected using a high power adapter, then the mobile clears the pop-up window upon detection of the external power source. The mobile then is operational using the external power source, and the mobile does not charge the battery. According to one embodiment of the invention, the mobile powers down if the user disconnects the external power source.

Figure 4:
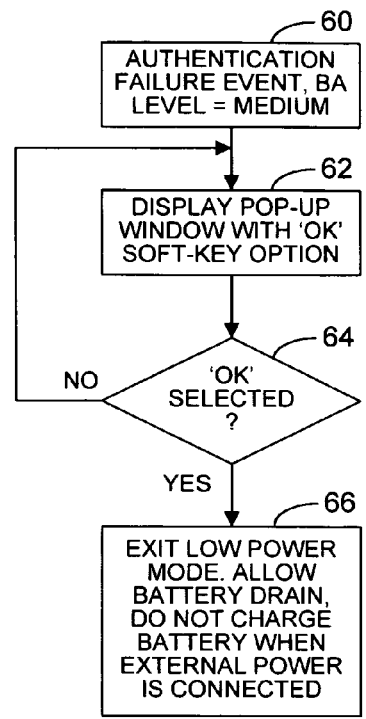
FIG. 4 is a flow diagram of an exemplary method of battery authentication for a battery authentication level set to "medium" according to one embodiment of the present invention.

Referring to FIG. 4, the device has entered a battery authentication failure event for a medium security level, block 60. The mobile device displays a pop-up window with a message informing the user that the installed battery is not authentic, block 62. The window also provides a soft-key option "OK". The device waits for the user to acknowledge the message. If the user presses the 'OK' soft key, block 64, the pop-up window is cleared, block 66, and the device exits low power mode and enters the system determination state as directed by the PRL. For the medium security level, the battery is allowed to drain and the mobile device operates as normal with the authentication-failed battery. However, if an external power source is connected, the mobile operates from the external source, but the battery is not charged.

Figure 5:
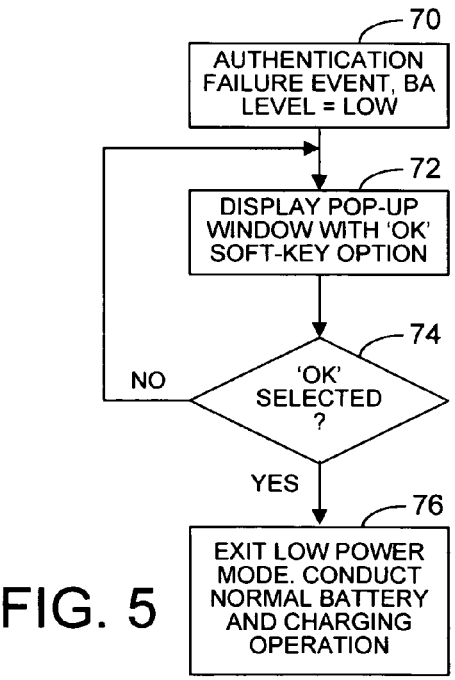
FIG. 5 is a flow diagram of an exemplary method of battery authentication for a battery authentication level set to "low" according to one embodiment of the present invention.

FIG. 5 illustrates battery authentication failure event procedures when the battery security level is set to low. In block 70, the mobile has entered the battery authentication failure event. The mobile device displays a pop-up window informing the user that installed battery is not authentic, block 72. The pop-up window also provides an "OK" soft key to prompt the user to acknowledge the message regarding the battery. If the soft key is selected, block 74, then the device clears the pop-up window and exits the low power mode. Normal battery and charging operations are allowed to proceed, block 76, and the mobile device enters the system determination state as directed by the PRL.

Figure 7:
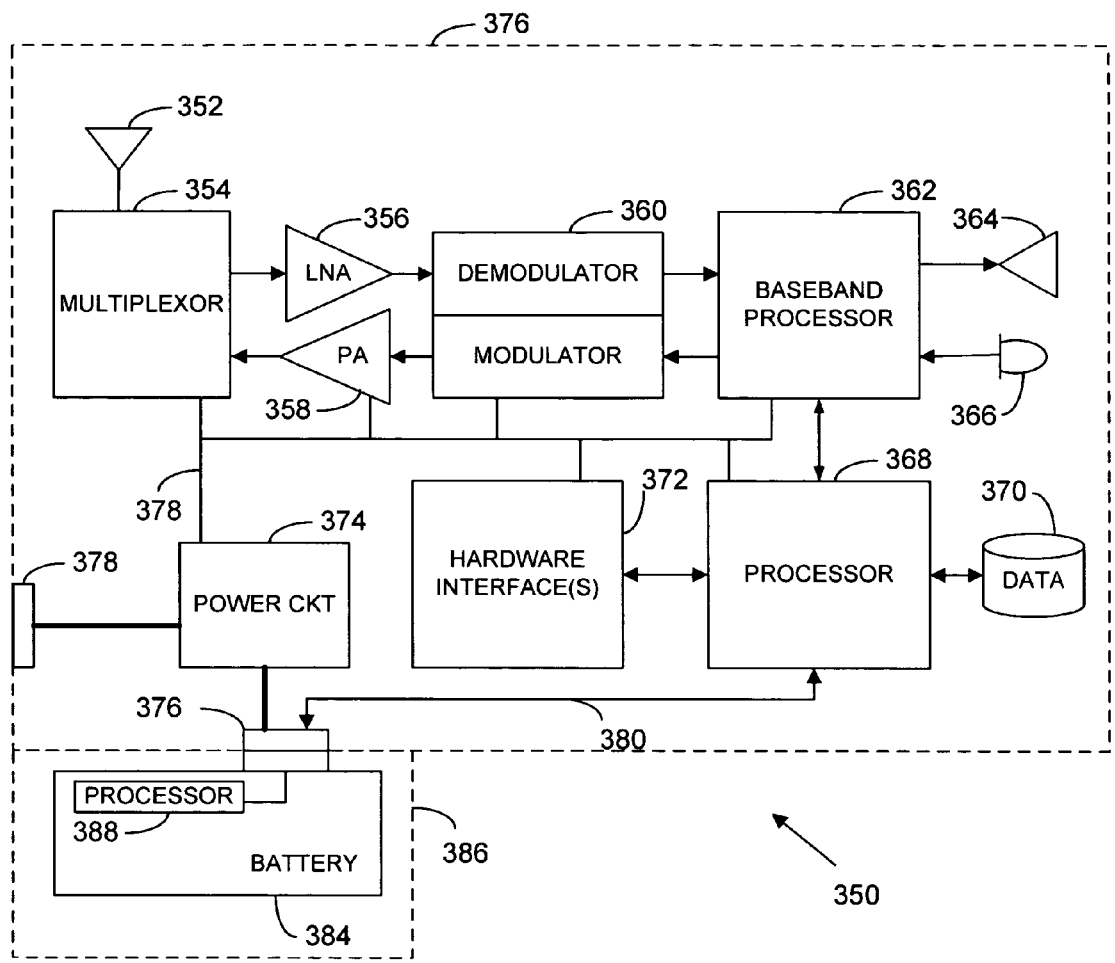
FIG. 7 is a block diagram of an exemplary battery authentication system according to one embodiment of the present invention.

FIG. 7 is a block diagram illustrating an exemplary wireless communications device 350 that may be used in connection with the various embodiments described herein. For example, the wireless communications device 350 may be used in conjunction with a handset or PDA network device. However, other wireless communications devices and/or architectures may also be used, as will be clear to those skilled in the art.

In the illustrated embodiment, wireless communications device 350 comprises an antenna 352, a multiplexor 354, a low noise amplifier ("LNA") 356, a power amplifier ("PA") 358, a modulation circuit 360, a baseband processor 362, a speaker 364, a microphone 366, a processor 368, a data storage area 370, a power circuit 374, and a hardware interface 372. Various user interface devices (not shown), such as keypads and display devices, may be communicably couple to hardware interface 372 for receiving user input and communicating output messages. In the wireless communications device 350, radio frequency ("RF") signals are transmitted and received by antenna 352. Elements 354, 356, 358, and 360 may be collectively referred to as a transceiver.

Multiplexor 354 acts as a switch, coupling antenna 352 between the transmit and receive signal paths. In the receive path, received RF signals are coupled from a multiplexor 354 to LNA 356. LNA 356 amplifies the received RF signal and couples the amplified signal to a demodulation portion of the modulation circuit 360. The demodulator strips away the RF carrier signal leaving a base-band receive signal, which is sent from the demodulator output to the base-band processor 362.

If the base-band receive audio signal contains audio information, then base-band processor 362 decodes the signal and converts it to an analog signal. Then the signal is amplified and sent to the speaker 364. The base-band processor 362 also receives analog audio signals from the microphone 366. These analog audio signals are converted to digital signals and encoded by the base-band processor 362. The base-band processor 362 also codes the digital signals for transmission and generates a base-band transmit audio signal that is routed to the modulator portion of modulation circuit 360. The modulator mixes the base-band transmit audio signal with an RF carrier signal generating an RF transmit signal that is routed to the power amplifier 358. The power amplifier 358 amplifies the RF transmit signal and routes it to the multiplexor 354 where the signal is switched to the antenna port for transmission by antenna 352.

The baseband processor 362 is also communicatively coupled with the processor 368. The processor 368 has access to a data storage area 370. The processor 368 is preferably configured to execute instructions embodied in software such as the methods of FIGS. 1 through 6 that can be stored in the data storage area 370. A battery 384 is connected to the power circuit 374 through a connector 376. The battery 384 is typically housed within the device in a recessed compartment 386. An external power source (not shown) can also be connected through a connector 378 to provide power to the device and to re-charge the battery 384. The battery 384 includes a processor-type element 388 which runs the encryption algorithm 132 as shown in FIG. 6.

The present invention further relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention.

From the above description of exemplary embodiments of the invention, it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described exemplary embodiments are to be considered in all respects as illustrative and not restrictive. It should also be understood that the invention is not limited to the particular exemplary embodiments described herein, but is capable of many rearrangements, modifications, and substitutions without departing from the scope of the invention.

What is claimed is:

1. A method for battery authentication in a wireless communication device with an attached battery, comprising the steps of:
   (a) the wireless communication device entering a low power mode, wherein the low power mode prevents the wireless communication device from initiating and receiving calls;
   (b) the wireless communication device sending, in the low power mode, a pre-stored plain text to the attached battery, wherein the pre-stored plain text is generated by a tool external to the wireless communication device, wherein the pre-stored plain text is stored in a memory of the wireless communication device during provisioning;
   (c) waiting, in the low power mode, for a first time period after the step of sending to receive encrypted text from the attached battery;
   (d) if encrypted text is not received within the first time period, then repeating, in the low power mode, the steps of (a) and (b) up to a pre-defined number of attempts,
   (e) if the encrypted text is not received within the first time period, and the pre-defined number of attempts is exhausted, then entering, in the low power mode, a battery authentication failure event procedure;
   (f) if encrypted text is received within the first time period, then comparing, in the low power mode, the encrypted text received by the wireless communication device with a pre-stored encrypted text that is associated with the pre-stored plain text;
   (g) if the encrypted text received by the wireless communication device matches the pre-stored encrypted text, then identifying the attached battery as an authentic battery and entering an operational mode, wherein the operational mode enables the wireless communication device to proceed with normal operations; and
   (h) if the encrypted text received by the wireless communication device does not match the pre-stored encrypted text, then entering the battery authentication failure event procedure.

2. The method of claim 1, wherein the pre-defined number of attempts is one (1).

3. The method of claim 1, wherein the pre-determined number of attempts is greater than one.

4. The method of claim 1, wherein the wireless communication device stores a plurality of pairs of a plain text and an associated encrypted text, further comprising the step of:
   randomly choosing a pair of the plain text and the associated encrypted text from the plurality of pairs for sending to the attached battery.

5. The method of claim 1, wherein the pre-stored encrypted text is generated by a tool external to the wireless communication device;
   wherein the tool uses a first encryption algorithm; and
   wherein the authentic battery uses the first encryption algorithm to generated the encrypted text received by the wireless communication device.

6. The method of claim 5, wherein the first encryption algorithm is a block cipher algorithm.

7. The method of claim 1, wherein a battery authentication security level is "high", and wherein the battery authentication failure event procedure comprises the steps of:
   displaying a message in a pop-up window to indicate that the attached battery is not authentic;
   providing an emergency call option in the pop-up window;
   powering down the wireless communication device if the emergency call option is not selected within a second time period;
   placing an emergency call if the emergency call option is selected.

8. The method of claim 7, wherein the step of placing an emergency call further comprising the steps of:
   entering an emergency call back mode;
   allowing the attached battery to drain;
   blocking normal battery charging operations; and
   entering a low power mode.

9. The method of claim 1, wherein a battery authentication security level is "medium", and wherein the battery authentication failure event procedure comprises the steps of:
   displaying a message in a pop-up window to indicate that the attached battery is not authentic;
   receiving a message acknowledgement;
   conducting normal battery operations; and
   blocking normal battery charging operations.

10. The method of claim 1, wherein a battery authentication security level is "low" and wherein the battery authentication failure event procedure comprises the steps of:
    displaying a message in a pop-up window to indicate that the attached battery is not authentic;
    receiving a message acknowledgement;
    conducting normal battery operations; and
    conducting normal battery charging operations.

11. A wireless communication device comprising:
    a processor;
    a memory coupled to the processor;
    a transceiver coupled to the processor;
    an input device coupled to the processor;
    a display coupled to the processor;

an attachable battery coupled to the processor software executable by the processor for carrying out the method of:
(a) entering a low power mode, wherein the low power mode prevents the wireless communication device from initiating and receiving calls;
(b) sending, in the low power mode, a pre-stored plain text to the attachable battery, wherein the pre-stored plain text is generated by a tool external to the wireless communication device, wherein the pre-stored plain text is stored in the memory;
(c) waiting, in the low power mode for a first time period to receive encrypted text from the attachable battery;
(d) repeating, in the low power mode, steps (a) and (b) a pre-defined number of attempts if encrypted text is not received within the first time period;
(e) if encrypted text is not received within the first time period and the pre-defined number of attempts is exhausted, then entering in the low power mode, a battery authentication failure event procedure;
(f) if encrypted text is received within the first time period, then comparing, in the low power mode, the encrypted text received by the wireless communication device with a pre-stored encrypted text that is associated with the pre-stored plain text and stored in the memory;
(g) if the encrypted text received by the wireless communication device matches the pre-stored encrypted text, then identifying the attached battery as an authentic battery and entering an operational mode, wherein the operational mode enables the wireless communication device to proceed with normal operations; and
(h) if the encrypted text received by the wireless communication device does not match the pre-stored encrypted text, then entering the battery authentication failure event procedure.

12. The wireless communication device of claim 11, wherein a battery authentication security level is "high", and wherein the battery authentication failure event procedure carried out by the processor comprises the steps of:
displaying a message in a pop-up window in the display to indicate that the attachable battery is not authentic;
providing an emergency call option in the pop-up window;
powering down the wireless communication device if the emergency call option is not selected within a second time period;
placing an emergency call if the emergency call option is selected.

13. The wireless communication device of claim 12, wherein the step of placing an emergency call of the battery authentication failure event procedure carried out by the processor further comprises the steps of:
entering an emergency call back mode;
allowing the attachable battery to drain;
blocking normal battery charging operations; and
entering a low power mode.

14. The wireless communication device of claim 11, wherein a battery authentication security level is "medium", and wherein the battery authentication failure event procedure carried out by the processor comprises the steps of:
displaying a message in a pop-up window on the display to indicate that the attachable battery is not authentic;
receiving a message acknowledgement;
conducting normal battery operations; and
blocking normal battery charging operations.

15. The wireless communication device of claim 11, wherein a battery authentication security level is "low", and wherein the battery authentication failure event procedure carried out by the processor comprises the steps of:
displaying a message in a pop-up window on the display to indicate that the attachable battery is not authentic;
receiving a message acknowledgement;
conducting normal battery operations; and
conducting normal battery charging operations.

16. The wireless communication device of claim 11, wherein the attachable battery is the authentic battery, the authentic battery comprising:
a processing device for running an encryption algorithm on the pre-stored plain text to produce the encrypted text.

17. The wireless communication device of claim 16, wherein the pre-stored encrypted text is generated by a tool external to the wireless communication device, and wherein the tool utilizes the encryption algorithm to generated the pre-stored encrypted text.

* * * * *